US010891530B2

(12) United States Patent
Nyalamadugu et al.

(10) Patent No.: US 10,891,530 B2
(45) Date of Patent: Jan. 12, 2021

(54) DETACHABLE RADIO FREQUENCY IDENTIFICATION SWITCH TAG

(71) Applicant: NEOLOGY, INC., San Diego, CA (US)

(72) Inventors: Sheshi Nyalamadugu, San Diego, CA (US); Joe Mullis, Oceanside, CA (US)

(73) Assignee: NEOLOGY, INC., San Diego, CA (US)

(*) Notice: Subject to any disclaimer, the term of this patent is extended or adjusted under 35 U.S.C. 154(b) by 0 days.

(21) Appl. No.: 16/677,444

(22) Filed: Nov. 7, 2019

(65) Prior Publication Data

US 2020/0143219 A1 May 7, 2020

Related U.S. Application Data

(60) Provisional application No. 62/757,018, filed on Nov. 7, 2018.

(51) Int. Cl.
*G06K 19/07* (2006.01)
*G06K 19/077* (2006.01)

(52) U.S. Cl.
CPC ... *G06K 19/0724* (2013.01); *G06K 19/07752* (2013.01); *G06K 19/07775* (2013.01)

(58) Field of Classification Search
None
See application file for complete search history.

(56) References Cited

U.S. PATENT DOCUMENTS

| 8,561,911 | B2* | 10/2013 | Mullis | G06K 19/07703 |
| | | | | 235/492 |
| 9,172,130 | B2* | 10/2015 | Forster | H01Q 1/2225 |
| 10,262,167 | B2* | 4/2019 | Nyalamadugu | G06K 7/10415 |
| 2004/0089707 | A1* | 5/2004 | Cortina | G06K 19/0723 |
| | | | | 235/375 |
| 2011/0037541 | A1 | 2/2011 | Johnson et al. | |
| 2012/0235870 | A1* | 9/2012 | Forster | H01C 25/20 |
| | | | | 343/728 |

(Continued)

FOREIGN PATENT DOCUMENTS

KR 10-2014-0094309 A 7/2014

OTHER PUBLICATIONS

International Search Report and Written Opinion dated Apr. 8, 2020 for corresponding application PCT/US2019/060534 (11 pages).

*Primary Examiner* — Thomas S McCormack
(74) *Attorney, Agent, or Firm* — Procopio, Cory, Hargreaves & Savitch LLP

(57) ABSTRACT

A radio frequency identification (RFID) switch tag is disclosed. This RFID switch tag includes a base component having an ultra-high frequency (UHF) booster, and a detachable component having at least one UHF RFID module and a high frequency (HF) RFID module. In some embodiments, the detachable component is positioned in close proximity to the base component in a first configuration of the RFID switch tag such that the at least one UHF RFID module is sufficiently coupled to the UHF booster in the base component to form an UHF RFID system having a desired performance. The detachable component can also be separated from the base component to obtain a second configuration of the RFID switch tag, and the HF RFID module remains functional within the detached detachable component so that the detachable component can be used as a standalone HF RFID tag.

19 Claims, 7 Drawing Sheets

(56) References Cited

U.S. PATENT DOCUMENTS

| | | | |
|---|---|---|---|
| 2015/0090798 A1* | 4/2015 | Pachler | B42D 25/23 |
| | | | 235/492 |
| 2016/0342821 A1 | 11/2016 | Nyalamadugu et al. | |
| 2017/0195009 A1* | 7/2017 | Nagai | H04B 5/0081 |
| 2018/0260676 A1 | 9/2018 | Nyalamadugu et al. | |

* cited by examiner

DETACHABLE RADIO FREQUENCY IDENTIFICATION SWITCH TAG

RELATED APPLICATION INFORMATION

This patent application is claims the benefit under 35 U.S.C. § 119 (e) to U.S. Provisional Application No. 62/757,018, filed Nov. 7, 2018, the disclosure of which is incorporated herein by reference in its entirety.

BACKGROUND

1. Technical Field

The various embodiments described herein generally relate to radio frequency identification (RFID) systems and more particularly to an RFID switch tag that can be used for multiple applications.

2. Related Art

RFID technology harnesses electromagnetic fields to transfer data wirelessly. One of the primary uses for RFID technology is the automatic identification and tracking of objects via RFID tags, which may be attached or incorporated into a variety of objects. Examples include credit cards, passports, license plates, identity cards, cellphones/mobile devices, etc. RFID technology also has applications in numerous areas, including, but not limited to, electronic tolling, parking access, border control, payment processing, asset management, and transportation. Thus, for example, a license plate that includes an RFID tag may be used for the purposes of electronic toll collection (ETC), electronic vehicle registration (EVR), border crossing etc.

Different RFID applications may require different operation frequencies. For example, ultra high frequency (UHF) readers and transponder tags (e.g., operating at 915 megahertz (MHz) or 2.45 gigahertz (GHz)) provide greater read distances and faster data transfer rates, and are thus commonly deployed in ETC systems. In contrast, contactless payment systems may be implemented using high frequency (HF) or near field communication (NFC) readers and transponders (e.g., operating at 13.56 MHz), which tend to exhibit greater field penetration than UHF systems. However, the construction of a conventional RFID tag has limited flexibility to support operation in multiple frequencies.

SUMMARY

Embodiments described herein provide various designs of a radio frequency identification (RFID) tag which includes a base component and a detachable component so that the RFID tag can be configured in multiple configurations to support operations in multiple frequencies.

According to an aspect, a radio frequency identification (RFID) switch tag is disclosed. This RFID switch tag includes a base component having an ultra-high frequency (UHF) booster, such as an UHF booster antenna, and a detachable component having at least one UHF RFID module and a high frequency (HF) RFID module, such as a near-field communication (NFC) tag.

According to another aspect, the detachable component is positioned in close proximity to the base component in a first configuration of the RFID switch tag such that the at least one UHF RFID module is sufficiently coupled to the UHF booster in the base component to form an UHF RFID system having a desired performance, such as a desired operating range of the UHF RFID system. In some embodiments, the detachable component is separated from the base component to obtain a second configuration of the RFID switch tag, and the HF RFID module remains functional within the detached detachable component so that the detachable component can be used as a standalone HF RFID tag. Moreover, in the second configuration, the at least one UHF RFID module is decoupled from the UHF booster in the base component to render the at least one UHF RFID module nonfunctional.

According to still another aspect, the detachable component can be detached from the base component to obtain a second configuration of the RFID switch tag such that the HF RFID module remains functional within the detached detachable component. The HF RFID module can be used as a near-field communication (NFC) tag in a second RFID application which requires an NFC operating range.

According to still another aspect, the RFID switch tag can be placed within a vehicle to serve as an RFID tag in an electronic toll collection (ETC) application.

According to still another aspect, the first RFID application is a first ETC application for high occupancy vehicle (HOV) lanes and the second RFID application is a second ETC application for single occupancy vehicle (SOV) lanes.

Other features and advantages of the present inventive concept should be apparent from the following description which illustrates by way of example aspects of the present inventive concept.

BRIEF DESCRIPTION OF THE DRAWINGS

The embodiments described herein will be understood from a review of the following detailed description and the accompanying drawings in which like reference numerals refer to like parts and in which.

DETAILED DESCRIPTION

Figure 1:
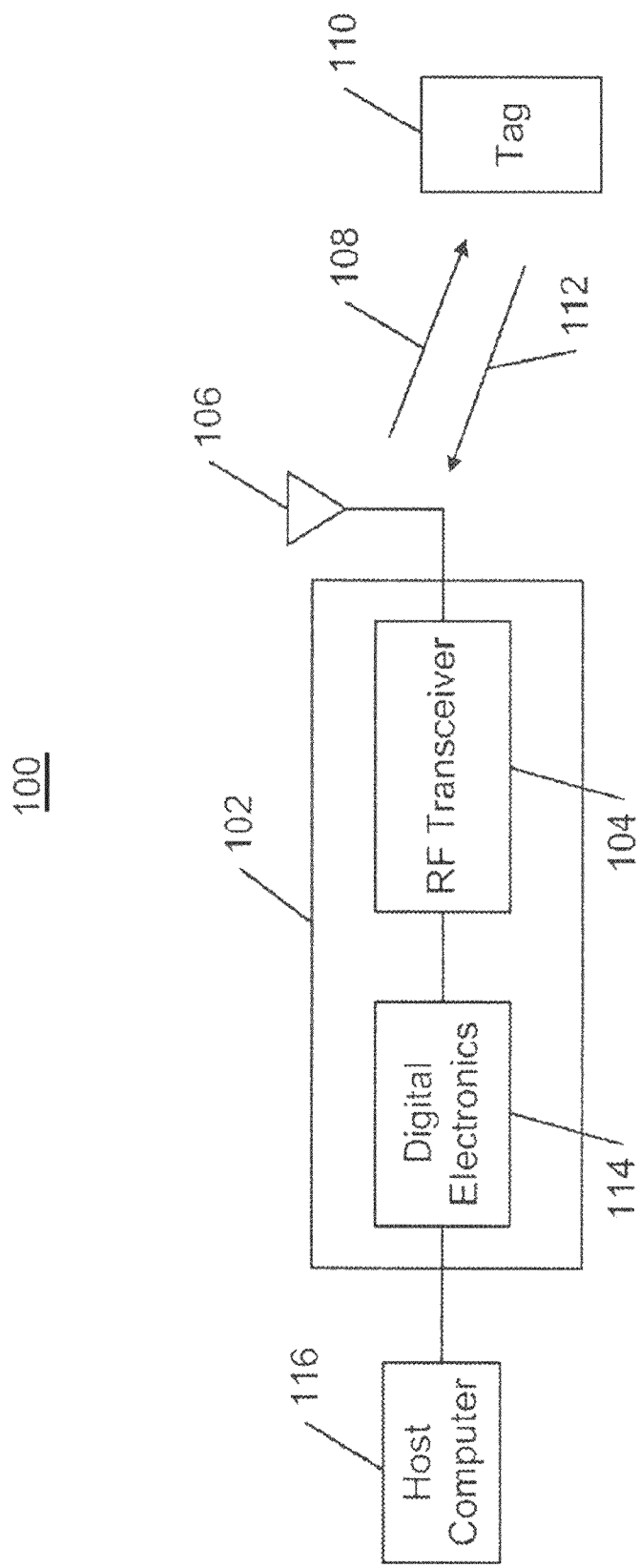
FIG. 1 shows a diagram illustrating an exemplary RFID system in accordance with one embodiment described herein.

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Embodiments described herein provide various designs of a radio frequency identification (RFID) tag which includes at least one base component and a detachable component such that the RFID tag can be configured in multiple configurations to support operations in multiple frequencies.

In one aspect, a radio frequency identification (RFID) switch tag is disclosed. This RFID switch tag includes a base component having an ultra-high frequency (UHF) booster, such as an UHF booster antenna, and a detachable component having at least one UHF RFID module and a high frequency (HF) RFID module, such as a near-field communication (NFC) tag. In some embodiments, the detachable component is positioned in close proximity to the base component in a first configuration of the RFID switch tag such that the at least one UHF RFID module is sufficiently coupled to the UHF booster in the base component to form an UHF RFID system having a desired performance, such as a desired operating range of the UHF RFID system. In some embodiments, the detachable component is separated from the base component to obtain a second configuration of the RFID switch tag in which the HF RFID module remains functional within the detached detachable component so that the detachable component can be used as a standalone HF RFID tag. Moreover, in the second configuration, the at least one UHF RFID module is decoupled from the UHF booster in the base component to render the at least one UHF RFID module nonfunctional.

According to other embodiments, a technique for using an RFID switch tag that includes a base component and a detachable component is disclosed, wherein the base component further includes an ultra-high frequency (UHF) booster and the detachable component further includes at least one UHF RFID module and a high frequency (HF) RFID module. This technique can include positioning the detachable component in close proximity to the base component in a first configuration of the RFID switch tag such that the at least one UHF RFID module in the detachable component is sufficiently coupled to the UHF booster in the base component to form an UHF RFID tag having a desired operating range longer than an operating range of the at least one UHF RFID module. The technique further includes using the UHF RFID tag in a first RFID application, which requires the desired operating range. In some embodiments, the technique also includes detaching the detachable component from the base component to obtain a second configuration of the RFID switch tag such that the HF RFID module remains functional within the detached detachable component. The technique additionally includes using the HF RFID module as a near-field communication (NFC) tag in a second RFID application which requires an NFC operating range.

FIG. 1 shows a diagram illustrating an exemplary RFID system 100 in accordance with one embodiment described herein. In system 100, RFID interrogator 102 communicates with one or more RFID tags 110. Data can be exchanged between interrogator 102 and RFID tag 110 via radio transmit signal 108 and radio receive signal 112. RFID interrogator 102 comprises RF transceiver 104, which contains transmitter and receiver electronics, and antenna 106, which are configured to generate and receive radio transit signal 108 and radio receive signal 112, respectively. Exchange of data can be accomplished via electromagnetic or electrostatic coupling in the RF spectrum in combination with various modulation and encoding schemes.

RFID tag 110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 108 determines the operational range of RFID tag 110.

RF transceiver 104 transmits RF signals to RFID tag 110, and receives RF signals from RFID tag 110, via antenna 106. The data in transmit signal 108 and receive signal 112 can be contained in one or more bits for the purpose of providing identification and other information relevant to the particular RFID tag application. When RFID tag 110 passes within the range of the radio frequency magnetic field emitted by antenna 106, RFID tag 110 is excited and transmits data back to RF interrogator 102. A change in the impedance of RFID tag 110 can be used to signal the data to RF interrogator 102 via receive signal 112. The impedance change in RFID tag 110 can be caused by producing a short circuit across the tag's antenna connections (not shown) in bursts of very short duration. RF transceiver 104 senses the impedance change as a change in the level of reflected or backscattered energy arriving at antenna 106.

Digital electronics 114, which can comprise a microprocessor with RAM, performs decoding and reading of receive signal 112. Similarly, digital electronics 114 performs the coding of transmit signal 108. Thus, RF interrogator 102 facilitates the reading or writing of data to RFID tags, e.g. RFID tag 110 that are within range of the RF field emitted by antenna 104. Together, RF transceiver 104 and digital electronics 114 comprise reader 118. Finally, digital electronics 114 and can be interfaced with an integral display and/or provide a parallel or serial communications interface to a host computer or industrial controller, e.g. host computer 116.

Figure 2:
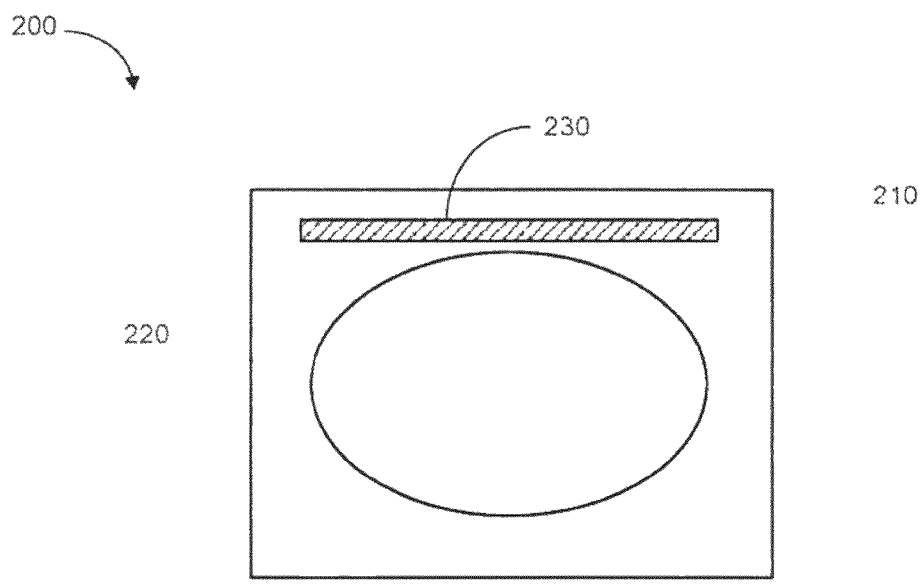
FIG. 2 shows a top-view illustration of an exemplary RFID switch tag in an attached configuration in accordance with one embodiment described herein.

FIG. 2 shows a top-view illustration of an exemplary RFID switch tag 200 in an attached configuration in accordance with one embodiment described herein. In some embodiments, RFID switch tag 200 is used to implement RFID tag 110 in RFID system 100 shown in FIG. 1. As illustrated in FIG. 2, RFID switch tag 200 includes a base component 210 and a detachable component 220. In some embodiments, base component 210 includes an UHF booster 230, such as a booster antenna. Note that UHF booster 230 can include a passive booster, an active booster, or a battery-assisted passive booster. The detachable component 220 can include at least one UHF RFID module and an HF RFID module or tag. In particular embodiments, the at least one HF RFID module included in detachable component 220 is a near field communication (NFC) module. In some embodiments, the UHF RFID module and the HF RFID module share a common integrated circuit (IC) chip. In these embodiments, detachable component 220 essentially acts as a dual-frequency RFID tag.

The reference to a HF or UHF tag is intended to indicate that the HF or UHF module included in detachable component 220 comprise all the components necessary to perform the functions of a RFID tag, such as described with respect to tag 110 in FIG. 1. As noted, in certain embodiments, the modules can share components such as the IC, or portions of the IC and potentially the antenna. Although, sharing of the antenna or any components can depend on the frequency of operation, the required matching impendence, the protocols being used, etc.

Although the embodiment of FIG. 2 shows that detachable component 220 is positioned substantially in the middle of base component 210, other embodiments can have detachable component 220 placed in a non-centered position relative to base component 210. When placed near the base component 210, the UHF module can be configured such that it will inductively couple with the UHF booster antenna 230 in the base component 210.

In one exemplary embodiment, the at least one UHF RFID module included in detachable component 220 is coupled with UHF booster antenna 230 included in base component 210 to form an UHF RFID system of desire performances. For example, the desired performances include a desired operating range for the UHF RFID system. In one embodiment, an UHF coupling antenna within the at least one UHF RFID module in detachable component 220 is positioned in a manner to ensure a sufficient amount of coupling, such as an inductive coupling, a capacitive coupling, or both, between the UHF coupling antenna in detachable component 220 and UHF booster antenna 230 in base component 210. The at least one UHF RFID module and the HF RFID tag, such as an NFC tag included in the detachable component 220 can be active, passive, or battery-assisted passive without departing from the scope of the inventive concept of this disclosure.

Although detachable component 220 is shown to have an oval shape, other embodiments of detachable component 220 can have other shapes, such as a circular shape, a rectangular shape, a triangular shape without departing from the scope of the inventive concept of this disclosure. Furthermore, if detachable component 220 has a rectangular shape, the rectangular shape can have either right-angled corners or rounded-corners. When detachable component 220 has a rectangular shape and rounded-corners, detachable component 220 may have an appearance of a card.

In RFID switch tag 200 shown in FIG. 2, detachable component 220 may be attached to base component 210 in a number of ways. For example, detachable component 220 can be placed inside a pocket attached to base component 210. In some embodiments, detachable component 220 can be placed inside a cutout within base component 210 having a shape of detachable component 220 but configured with a slightly smaller profile to allow detachable component 220 to be securely held inside the cutout.

[Coupling]

According to one exemplary embodiment, RFID switch tag 200 can serve as a windshield tag. In this embodiment, base component 210 of RFID switch tag 200 can be attached to a vehicle's windshield using, for example, adhesives (e.g., adhesive strips). When RFID switch tag 200 is used as a windshield tag, RFID switch tag 200 can be used in various electronic toll collection (ETC) applications. For example, when RFID switch tag 200 is placed on a windshield with both base component 210 and detachable component 220, the at least one UHF module in detachable component 220 is coupled with UHF booster antenna 230 in base component 210 to form an UHF system having desired performances, such as a long operating range; however, when detachable component 220 is separated from base component 210 and the windshield, base component 210 can remain on the windshield but the at least one UHF module in detachable component 220 is no longer coupled to UHF booster antenna 230 in base component 210. As a result, neither the at least one UHF module in detachable component 220 nor UHF booster antenna 230 in base component 210 can be able to achieve the intended functionality of an UHF system, i.e., the UHF module is disabled.

Figure 3:
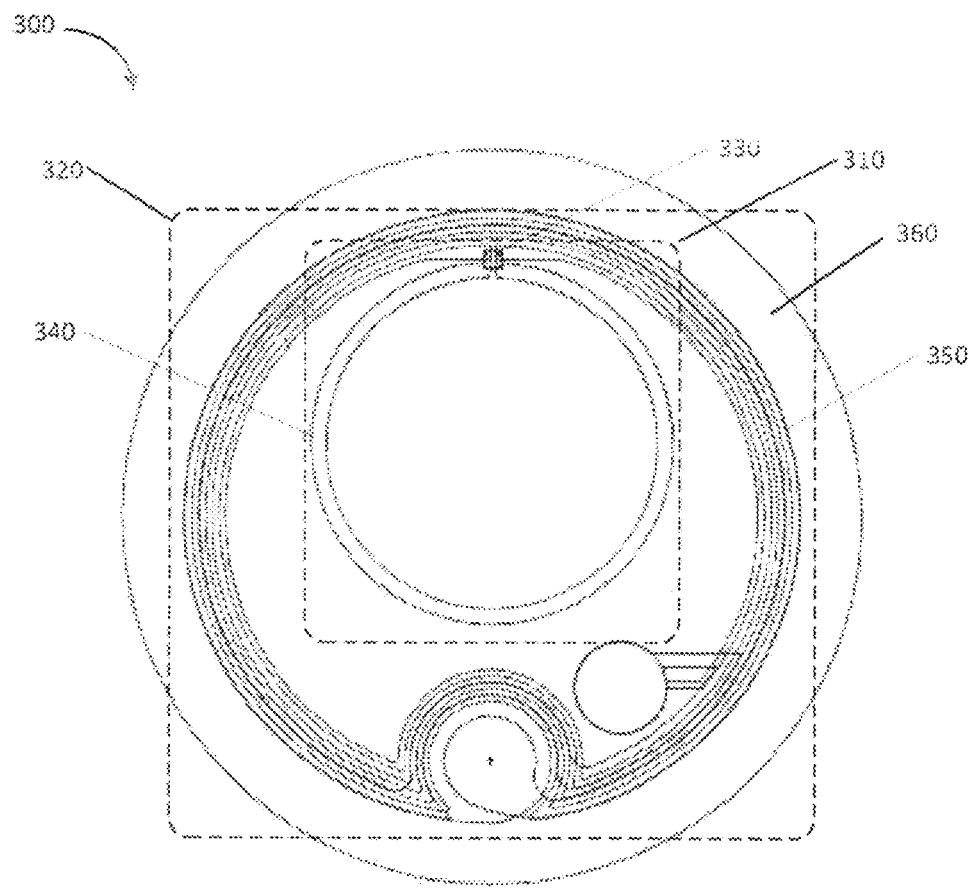
FIG. 3 shows a top-view illustration of an exemplary detachable component in the form of a dual-frequency RFID module in accordance with some embodiments described herein.

FIG. 3 shows a top-view illustration of an exemplary detachable component 220 in the form of a dual-frequency RFID module 300 in accordance with some embodiments described herein. As illustrated in FIG. 3, multi-frequency RFID module 300 includes an UHF module 310 and an NFC tag 320. More specifically, UHF module 310 further includes an integrated circuit (IC) chip 330 (or "chip 330" hereinafter) and an UHF loop 340, while NFC tag 320 further includes chip 330 and an HF antenna 350. Hence, in the embodiment shown, UHF module 310 and NFC tag 320 share chip 330. Chip 330 can include a memory (not shown) and other circuits. Dual-frequency RFID module 300 can also include a substrate 360 that provides structural supports for UHF module 310 and NFC tag 320. In various embodiments, chip 330, UHF loop 340 and HF antenna 350 can be deposited or fabricated on substrate 360.

In the embodiment of multi-frequency RFID module 300 illustrated in FIG. 3, UHF loop 340 is positioned substantially inside the loops of HF antenna 350. In some embodiments, HF antenna 350 is tuned to operate at a desired high frequency, such as 13.56 MHz. UHF loop 340 can also be tuned to operate at a desired ultra high frequency, such as 915 MHz or 2.45 GHz. In some embodiments, UHF loop 340 is used to couple chip 330 to UHF booster antenna 230 in base component 210 to form a functional UHF RFID tag. UHF loop 340 can be an UHF antenna by itself. Generally, UHF loop 340 can be implemented as any coupling means for coupling chip 330 to UHF booster antenna 230 in base component 210.

In the exemplary embodiment shown in FIG. 3, HF antenna 350 is configured as a loop antenna that includes multiple circular loops. However, in other embodiments, HF antenna 350 can be constructed with non-circular-shaped loops, such as rectangular loops without departing from the scope of the present inventive concept. Also in this embodiment, UHF loop 340 is shown to include two circular loops; however, in other embodiments, UHF loop 340 can include a single loop or more than two loops. While loops in UHF loop 340 is shown to be circular, UHF loop 340 can also be constructed with non-circular-shaped loops, such as rectangular loops without departing from the scope of the present inventive concept.

In some embodiments, chip 330 is configured to perform functions associated with both NFC and UHF systems including, but not limited to, encoding/decoding, modulation/demodulation, digital and analog processing, and data storage. Although multi-frequency RFID module 300 uses a single IC chip 330 for both the UHF RFID module and the NFC tag, other implementations of detachable component 220 can use separate IC chips for the UHF RFID module and the NFC tag.

Figure 4:
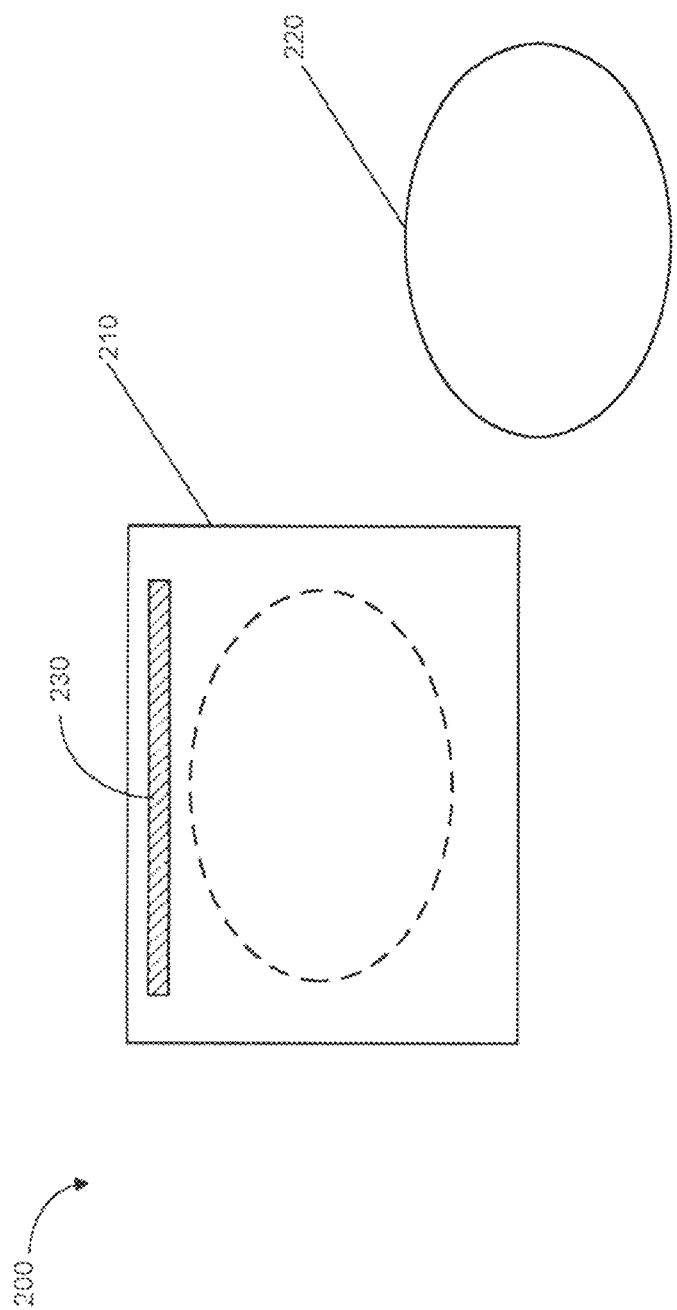
FIG. 4 shows a top-view illustration of RFID switch tag in a detached configuration in accordance with one embodiment described herein.

FIG. 4 shows a top-view illustration of RFID switch tag 200 in a detached configuration in accordance with one embodiment described herein. Referring to FIGS. 2 and 4, while FIG. 2 shows that detachable component 220 is attached to base component 210, FIG. 4 shows that detachable component 220 can be separated and detached from base component 210. Notably, detaching detachable component 220 from base component 210 uncouples the at least one UHF RFID module in detachable component 220 from UHF booster antenna 230 in base component 210. As such, when detachable component 220 is detached from base component 210, the performances of the at least one UHF RFID module may be significantly affected. For example, detaching detachable component 220 from base component 210 can render the at least one UHF RFID module nonfunctional.

Notably, the HF RFID tag such as an NFC tag within detachable component 220 can remain functional when detachable component 220 is separated from base component 210. As such, detached detachable component 220 can be used exclusively as an HF RFID tag, such as an NFC tag (e.g., for making contactless payments). When used as an NFC tag, detachable component 220 can be configured with a shape and dimensions (including width, height, and thickness) so that it is sufficiently durable and can be conveniently placed inside a wallet, a purse, or a protective cover of a portable electronic device, such as a smartphone, a tablet, or an iPad™. The dimensions of detachable component 220 can be significantly greater than a typical RFID tag. In some embodiments, a rectangular shape having a size and a thickness that resembles a credit card is preferred. When detached from base component 210, detachable component 220 can be use in a "tap and go" manner in various NFC applications without being taken out of a wallet, a purse, or a protective cover of a portable electronic device where detachable component 220 is stored and carried around. In various embodiments, detachable component 220 is configured as a laminated card so that it is sufficiently durable through extensive uses as a standalone card. In some embodiments, detachable component 220 is configured with a hard case to provide additional durability and protection.

In some embodiments, RFID switch tag 200 is used in various ETC applications. For example, the at least one UHF RFID module in RFID switch tag 200 can be configured to be used in high occupancy vehicle (HOV) lanes, while the HF RFID tag in RFID switch tag 200 can be configured to be used in single occupancy vehicle (SOV) lanes. Hence, by switching detaching detachable component 220 between the detached configuration of RFID switch tag 200 and the attached configuration of RFID switch tag 200, RFID switch tag 200 permits a driver to switch between HOV operations and SOV operations using a single RFID switch tag 200. In such embodiments, the tag 200 can include a switching mechanism that allows the user to switch between the UHF and HF tags as required. U.S. patent application Ser. No. 15/160,982, entitled "Multi-Frequency Radio Frequency Identification Tag," filed May 20, 2016, which in turn claims priority to U.S. provisional Patent Application No. 62/165,167, also entitled "Multi-Frequency Radio Frequency Identification Tag," filed May 21, 2015; U.S. patent application Ser. No. 14/818,257, entitled "Methods and Apparatus for Preserving Privacy in an RFID System," filed Aug. 4, 2015, which in turn claims priority to U.S. patent application Ser. No. 14/229,786, now U.S. Pat. No. 9,098,790, entitled "Methods and Apparatus for Preserving Privacy in an RFID System," filed Mar. 28, 2014, which in turn claims priority to U.S. patent application Ser. No. 13/736,819, now U.S. Pat. No. 8,710,960, entitled "Methods and Apparatus for Preserving Privacy in an RFID System," filed Jan. 8, 2013, which in turn claims priority to U.S. patent application Ser. No. 12/364,158, now U.S. Pat. No. 8,350,673, entitled "Methods and Apparatus for Preserving Privacy in an RFID System," filed Feb. 2, 2009, which in turn claims priority to U.S. provisional Patent Application No. 61/025,000, also entitled "Method and Apparatus for Preserving Privacy in RFID Systems," filed Jan. 31, 2008; U.S. patent application Ser. No. 14/480,458, entitled "RFID Switch Tag," filed Sep. 8, 2014, which in turn claims priority to U.S. patent application Ser. No. 13/465,829, now U.S. Pat. No. 8,844,831, entitled "RFID Switch Tag," filed May 7, 2012, which in turn claims priority to U.S. provisional Patent Application No. 61/487,372, filed May 18, 2011 and 61/483,586, filed May 6, 2011, both entitled "RFID Switch Tag;" U.S. patent application Ser. No. 14/578,196, entitled "RFID Switch Tag," filed Dec. 19, 2014, which in turn claims priority to U.S. patent application Ser. No. 14/060,407, now U.S. Pat. No. 8,944,337, entitled "RFID Switch Tag," filed Oct. 22, 2013, which in turn claims priority to U.S. patent application Ser. No. 13/465,834, now U.S. Pat. No. 8,561,911, entitled "RFID Switch Tag," filed May 7, 2012, which in turn claims priority to U.S. provisional Patent Application Nos. 61/487,372, filed May 18, 2011 and 61/483,586, filed May 6, 2011, both entitled "RFID Switch Tag," all of which are incorporated herein by reference as if set forth in full; disclose various embodiments of tags that allow switching between modules incorporated within a switchable and/or multi-frequency tag. Any of these mechanisms can be used in accordance with switch tag 200.

According to one exemplary embodiment, RFID switch tag 200 can be used in one or more account management applications. For example, RFID switch tag 200 can be used to track a vehicle for purposes of electronic tolling, parking access, and border control. At least some applications for the RFID switch tag 200 are described in U.S. Pat. Nos. 8,844,831 and 8,944,337, and U.S. patent application Ser. Nos. 14/480,458 and 14/578,196, the disclosures of which are incorporated herein by reference in their entirety.

In some embodiments, access to the memory on the at least one UHF module and the NFC tag included in the detachable component 220 can be granted based on a security key. The provision of secure identification solutions is described in U.S. Pat. Nos. 7,081,819, 7,671,746, 8,237,568, 8,322,044, and 8,004,410, the disclosures of which are incorporated by reference herein in their respective entirety.

Multi-frequency RFID tags such as the RFID switch tag 200 are also described in Reissued U.S. Pat. Nos. RE 43,355 and RE 44,691, the disclosures of which are incorporated by reference herein in their respective entirety.

Parent application Ser. No. 15/160,982, discloses a module that is similar to 300 that can itself me interfaced with an booster antenna and removed therefrom in order to interface with an booster antenna in another substrate, such as in a card. Here, the module 220 can be included in a card or other substrate as described, which itself can be interface with the booster antenna 230. This allows the inclusion of a switching mechanism as described above, which can allow the user to switch between, e.g., the HF and UHF modules in order to enable various functionality or applications. The switching can occur when the module 220 is interface with substrate 210, or when it is removed therefrom. Again U.S. patent application Ser. No. 15/160,982, entitled "Multi-Frequency Radio Frequency Identification Tag," filed May 20, 2016, which in turn claims priority to U.S. provisional Patent Application No. 62/165,167, also entitled "Multi-Frequency Radio Frequency Identification Tag," filed May 21, 2015; U.S. patent application Ser. No. 14/818,257, entitled "Methods and Apparatus for Preserving Privacy in an RFID System," filed Aug. 4, 2015, which in turn claims priority to U.S. patent application Ser. No. 14/229,786, now U.S. Pat. No. 9,098,790, entitled "Methods and Apparatus for Preserving Privacy in an RFID System," filed Mar. 28, 2014, which in turn claims priority to U.S. patent application Ser. No. 13/736,819, now U.S. Pat. No. 8,710,960, entitled "Methods and Apparatus for Preserving Privacy in an RFID System," filed Jan. 8, 2013, which in turn claims priority to U.S. patent application Ser. No. 12/364,158, now U.S. Pat. No. 8,350,673, entitled "Methods and Apparatus for Preserving Privacy in an RFID System," filed Feb. 2, 2009, which in turn claims priority to U.S. provisional Patent Application No. 61/025,000, also entitled "Method and Apparatus for Preserving Privacy in RFID Systems," filed Jan. 31, 2008; U.S. patent application Ser. No. 14/480,458, entitled "RFID Switch Tag," filed Sep. 8, 2014, which in turn claims priority to U.S. patent application Ser. No. 13/465,829, now U.S. Pat. No. 8,844,831, entitled "RFID Switch Tag," filed May 7, 2012, which in turn claims priority to U.S. provisional Patent Application No. 61/487,372, filed May 18, 2011 and 61/483,586, filed May 6, 2011, both entitled "RFID Switch Tag;" U.S. patent application Ser. No. 14/578,196, entitled "RFID Switch Tag," filed Dec. 19, 2014, which in turn claims priority to U.S. patent application Ser. No. 14/060,407, now U.S. Pat. No. 8,944,337, entitled "RFID Switch Tag," filed Oct. 22, 2013, which in turn claims priority to U.S. patent application Ser. No. 13/465,834, now U.S. Pat. No. 8,561,911, entitled "RFID Switch Tag," filed May 7, 2012, which in turn claims priority to U.S. provisional Patent Application Nos. 61/487,372, filed May 18, 2011 and 61/483,586, filed May 6, 2011, both entitled "RFID Switch Tag," disclose various switching mechanism and methods for switching a module such as module 220.

Some applications can require a placement of metallic material (e.g., retro-reflective material, holographic image) over the RFID switch tag 200. In order to preserve the transmission and reception capabilities of the RFID switch tag 200, a selective de-metallization process may be employed to treat the metallic material. Selective de-metallization is described in U.S. Pat. Nos. 7,034,688 and 7,463,154, the disclosures of which are incorporated by reference herein in their respective entirety.

Figure 5:
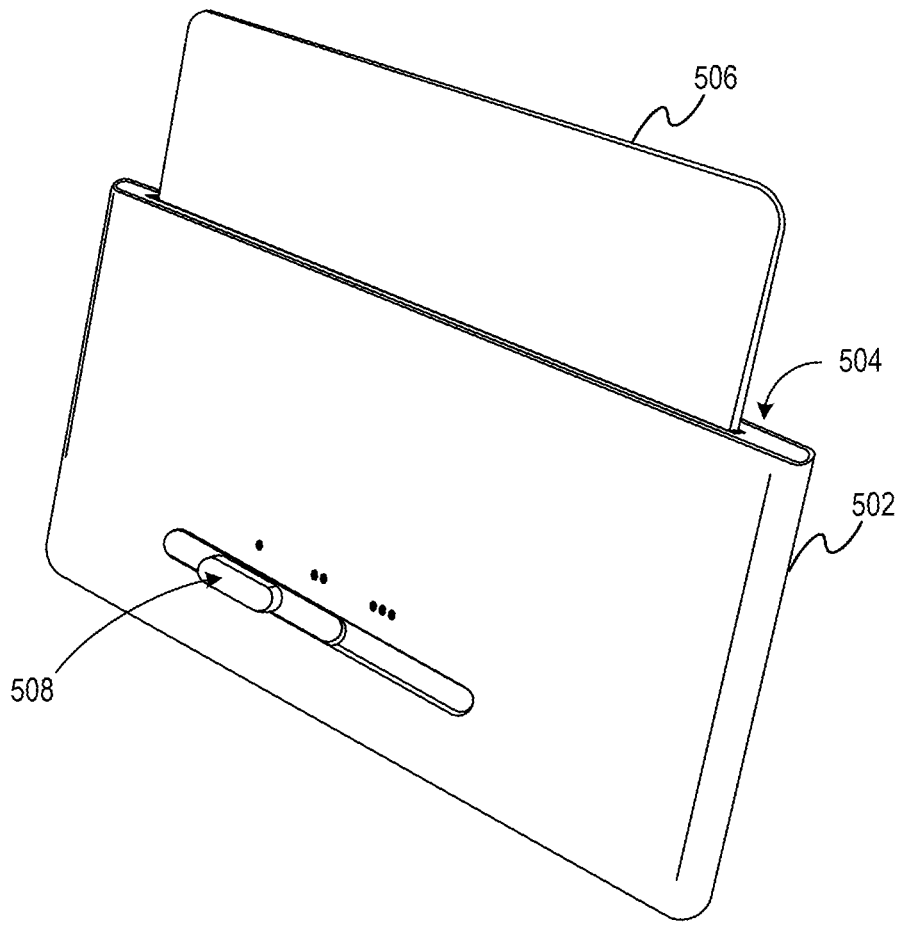
FIG. 5 shows a perspective view of a RFID system in accordance with another embodiment described herein.

In certain embodiments, the NFC, or HF tag or portion of the detachable component 220 can actually take the form of a card for use in an, e.g., NFC application. For example, the card could be a transit card used to access public transit. The card can be modified as described herein, however, to include at least one UHF module or component that can be couple to a booster antenna when the, e.g., transit card is inserted into a base unit. This is illustrated in FIG. 5, which shows a base unit 502 with slot 504 configured to receive card 506. As will be described with respect to FIG. 6, base unit 502 can also comprise a booster antenna that can couple with a UHF module included in card 506. In this manner, when card 506 is inserted in slot 504, a UHF "tag" is formed that can, e.g., function within a tolling environment.

In certain embodiments, card 506 can include multiple UHF module for, e.g., various tolling settings or applications as described above. In this case, a switch 508 can be included in order to allow the booster antenna to interface with the appropriate UHF module. When switch 508 is slid from one setting to another, the booster antenna is moved so that it will couple with the appropriate module.

Figure 6B:
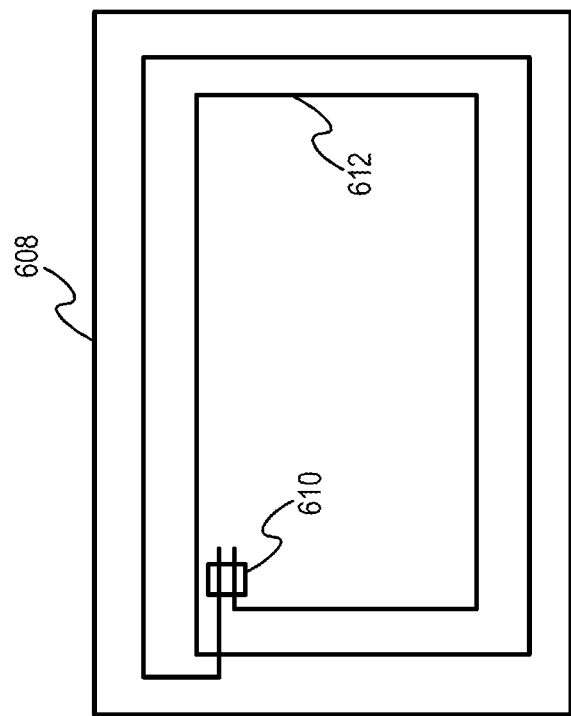
FIGS. 6A-D show the components of the embodiment shown in FIG. 5.
Figure 6A:
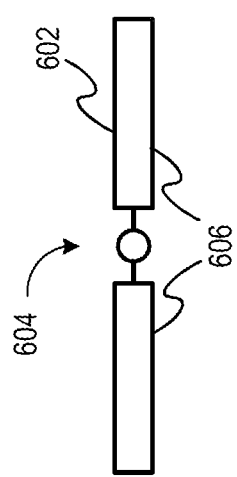

FIGS. 6A-6D illustrates the components of the system illustrated in FIG. 5. First, a UHF module 602 is illustrated in FIG. 6A. As can be seen, module 602 includes a chip 604 and leads 606. In this embodiment, leads 606 do not act as an antenna. This is to avoid coupling with the HF antenna 612, which is in close proximity with the UHF module 602 included with in the same substrate 608.

Figure 6C:
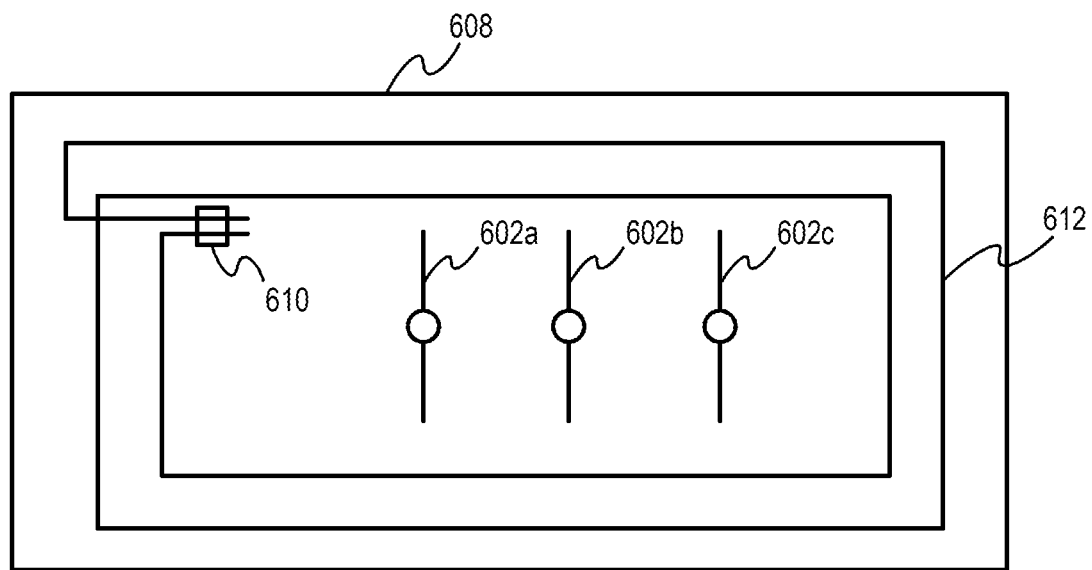

FIG. 6B illustrates the HF subsystem within card 502. As noted, card 502 will include a substrate 608 onto, or into which an HF antenna 612 has been formed. Antenna 612 is then coupled with a HF chip 610. Modules 602 can then be place on substrate 608 as illustrated in FIG. 6C. In the example of FIG. 6B, the modules 602a-c are placed in the center of the substrate and substantially in the center of the loops that form antenna 612.

Figure 6D:
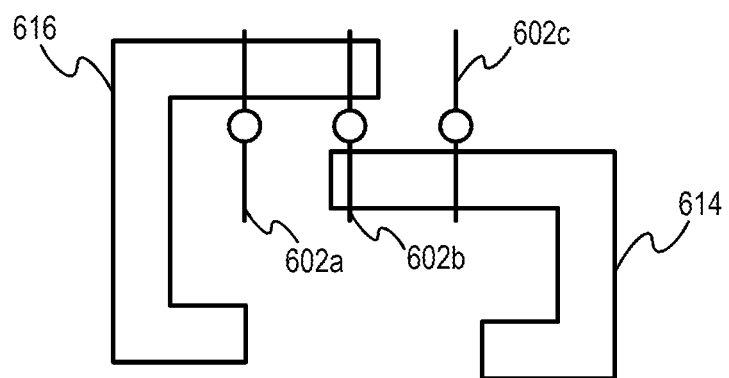

As illustrated in FIG. 6D, Antenna portions 614 and 616 can then be included within base unit 502. When card 506 is inserted in slot 504, antenna portions 614 and 616 can couple, e.g., inductively with a module 602. If there are multiple modules, then antenna portions 614 and 616 can be connected with switch 508, such that when switch 508 is slid back and forth between the various positions, the antenna will couple with the appropriate module 602a-c.

It will be understood that other forms of switching mechanisms can be included in base unit 502. The term "switching mechanism" means a device that can move the booster antenna between discrete positions so that it is interfaced with the appropriate module.

It will also be understood that different constructions for the booster antenna can be used depending on the requirements of a specific implementation. Moreover, in certain implementations, the switching mechanism can cause modules 602 to move relative to the position of the booster antenna.

Thus, the user can insert the card 502 in order to access their tolling account and to interface with toll systems. The user can then remove the card and use it to interface with other systems such as transit systems. The user can then maintain their toll and transit accounts to ensure adequate funds are available. In other embodiments, card 502 can simply be a credit or debit card.

The example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described can be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure.

What is claimed is:

1. A radio frequency identification (RFID) switch tag, comprising:
   a base component including an ultra-high frequency (UHF) booster;
   a detachable component, the detachable component including:
   at least one UHF RFID module configured to couple with the UHF booster, and
   a high frequency (HF) RFID module; and
   a switching mechanism configured to switch between the at least one UHF module and the high frequency module, wherein the base component comprises the switching mechanism.

2. The RFID switch tag of claim 1, wherein the detachable component is removably coupled to the base component.

3. The RFID switch tag of claim 2, wherein the UHF booster comprises a plurality of antenna portions and the at least on UHF RFID module comprises a plurality of leads and a chip, wherein the plurality of leads are configured to electrically couple with the plurality of antenna portions when the detachable component is coupled to the base component.

4. The RFID switch tag of claim 2, wherein the at least one UHF RFID module is configured to electrically coupled with the UHF booster when the detachable component is coupled to the base component.

5. The RFID switch tag of claim 4, wherein said electrical coupling comprises one or more of capacitive coupling and inductive coupling.

6. The RFID switch tag of claim 4, wherein the HF module is configured to communicate with a first system when the detachable component is not coupled to the base component and the UHF module is configured to communicate with a second system when the detachable component is coupled to the base component.

7. The RFID switch tag of claim 6, wherein the first system is a tolling system and the second system is a transit system.

8. The RFID switch tag of claim 1, wherein the at least one UHF RFID module comprises a plurality of UHF RFID modules.

9. The RFID switch tag of claim 8, wherein the switch mechanism is configured to switch which of the plurality of UHF RFID modules is electrically coupled to the UHF by changing a position of the UHF booster relative to the plurality of UHF RFID modules.

10. The RFID switch tag of claim 9, wherein a UHF RFID module of the plurality of UHF RFID modules is active when electrically coupled to the UHF booster and the remaining UHF RFID modules of the plurality of UHF RFID modules are inactive.

11. The RFID switch tag of claim 1, wherein the base component comprises an opening configured to receive the detachable component.

12. The RFID switch tag of claim 11, wherein the detachable component comprises a form corresponding to the opening, such that the detachable component is received within the opening.

13. The RFID switch tag of claim 1, wherein the detachable component is a card insertable into the opening.

14. The RFID switch tag of claim 1, wherein the UHF RFID module and the HF RFID module are disposed on a common substrate.

15. A radio frequency identification (RFID) switch tag, comprising:
   a base component including antenna portions having a plurality of positions;
   a detachable component removeably coupled to the base component, the detachable component including:
   a first RFID module configured to electrically couple to the antenna portions when the detachable component is coupled to the base component and the antenna portions are in a first position, and
   a second RFID module configured to electrically couple to the antenna portions when the detachable component is coupled to the base component and the antenna portions are in a second position; and
   a switching mechanism configured to switch between the first and second RFID modules by changing the position of the antenna portions between the first and second positions, wherein the base component comprises the switching mechanism.

16. The RFID switch tag of claim 15, wherein the detachable component comprises a third RFID module, wherein the third RFID module is active when the detachable component is not coupled to the base component.

17. The RFID switch tag of claim 16, wherein the first and second RFID modules are ultra-high frequency (UHF) RFID modules and the third RFID module is a high frequency (HF) RFID module.

18. The RFID switch tag of claim 15, wherein the detachable component is a card and the base component comprises a slot opening shaped to accept the card.

19. The RFID switch tag of claim 18, wherein the detachable component is a credit card.

* * * * *